D. P. SANDERS.
Carbureting Apparatus.

No. 223,763. Patented Jan. 20, 1880.

Witnesses:
W. McArthur
John C. Rogers

Inventor,
David P. Sanders
per Alexander Elliott
Attorneys

UNITED STATES PATENT OFFICE.

DAVID P. SANDERS, OF CANTON, PENNSYLVANIA, ASSIGNOR TO HIMSELF AND OLIVER P. SANDERS.

CARBURETING APPARATUS.

SPECIFICATION forming part of Letters Patent No. 223,763, dated January 20, 1880.

Application filed November 21, 1879.

*To all whom it may concern:*

Be it known that I, DAVID P. SANDERS, of Canton, in the county of Bradford and State of Pennsylvania, have invented certain new and useful Improvements in Carbureting Apparatus; and I do hereby declare that the following is a full, clear, and exact description thereof, reference being had to the accompanying drawings, and to the letters of reference marked thereon, which form part of this specification.

The nature of my invention consists in the construction and arrangement of an air-pump for carbureters, a float in the oil-tank or carbureter, and in the combination of parts, as will be hereinafter more fully set forth.

In order to enable others skilled in the art to which my invention appertains to make and use the same, I will now proceed to describe its construction and operation, referring to the annexed drawings, in which—

Figure 1:
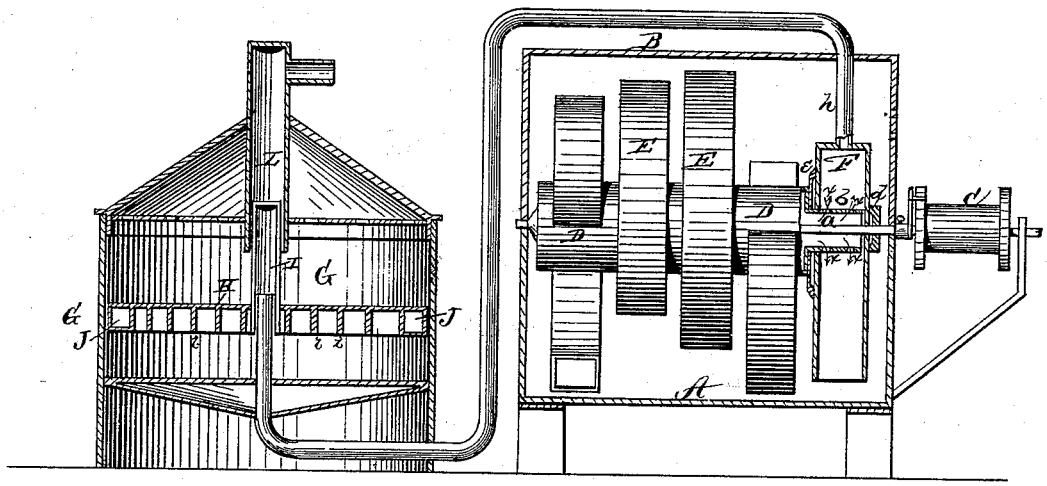
Figure 2:
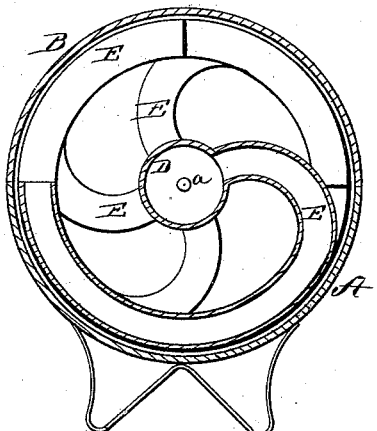
Figure 3:
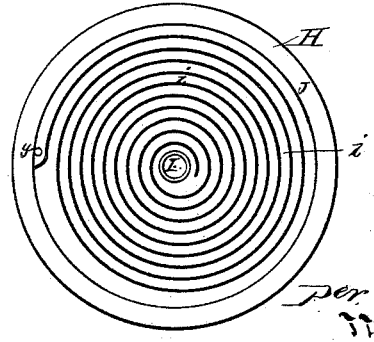

Figure 1 is a central vertical section; Fig. 2, a cross-section through the pump, and Fig. 3 a bottom view of the float.

A represents the case or shell in which the air-pump works, and which may be provided with a cover, B. This cover must then have suitable openings for the admission of air. Through the case or shell A passes a horizontal shaft, $a$, provided at one end, outside of the case, with a drum, C, which is loose thereon and connected thereto by a suitable pawl and ratchet. In operation the shaft $a$ is to be operated by a cord and weight, the cord being passed over suitable pulleys and connected to the drum, so as to keep the shaft in continuous rotation for any desired length of time. The drum is provided with a suitable crank for winding up the weight and cord.

On the shaft $a$ is suitably secured a horizontal cylinder, D, which revolves with the shaft. This cylinder is hollow and closed at one end, while the other end is made of smaller diameter for a short distance, and the so-reduced portion $b$ of the cylinder provided with a series of holes, $x$ $x$.

On the cylinder D are secured two, three, or more hollow arms, E E, which extend from the cylinder a short distance, and are then curved on a circle concentric with the cylinder. The outer ends of these hollow arms are open, while their inner ends open into the cylinder, and said arms should be arranged somewhat in spiral form on the cylinder, so as to make a balance.

On the reduced portion $b$ of the cylinder is placed an air-chamber, F, held in place by a nut, $d$. This nut, as well as the joint at $e$, should form ground-joints, so that the cylinder may revolve while the air-chamber remains stationary, and yet no air be allowed to escape.

The lower end of the air-chamber F is open, and from its upper end a pipe, $h$, connects with the carbureter G. When the cover B is used the pipe $h$ passes through the same and thereby holds the air-chamber stationary. When, however, said cover is not used other means must be added to keep the air-chamber from rotating.

A suitable quantity of water is to be in the case or shell A. As the outer end of each arm passes up out of the water, air, of course, enters the arm, and as the arm continues to revolve the arm becomes full of air until the outer end of the arm enters the water again on the other side. A certain amount of water passes through each arm into the cylinder and down through the air-chamber, while the air is forced in the same manner through the cylinder into the air-chamber and through the pipe $h$ into the carbureter. There is thus a steady and uniform supply of air furnished to the carbureter, the hollow circular arms forcing the air without suction.

The pipe $h$ extends upward in the center of the carbureter G for a suitable height, and enters a central tube, I, in the float H. This float is formed of a flat disk with a hollow downward-projecting rim, J, as shown, and on the under side of the float is attached a flange, $i$, arranged in the form of a close worm or spiral. The central tube, I, on the float extends a suitable distance above the float, is closed at its upper end, and acts as a guide for the float.

The rim J of the float sinks down into the hydrocarbon liquid sufficiently deep to have the lower edge of the spiral flange $i$ immersed therein, while a continuous spiral channel is formed from the center to the circumference. As the air is forced by the pump through the pipe $h$ said air will enter this spiral channel at the center, and during its passage over the surface of the hydrocarbon liquid to the circumference it becomes fully carbureted, and then, as illuminating-gas, it passes through the opening $y$ in the float into the top of the carbureter, whence, through a pipe, L, it may be conveyed to a gasometer or direct to the burners, as desired. The center tube, I, on the float conducts the air from the pipe $h$ into the spiral channel, as the float falls.

Certain modifications in the details of the construction may be made without departing from the spirit of my invention—such as, for instance, instead of reducing the end $b$ of the cylinder, the central shaft may have flanges over which the air-chamber can fit, but still have suitable ground-joints to prevent the escape of the air.

I am aware, however, that the segmental arms and the peculiar mode of constructing the float are not new, and therefore lay no claim, broadly, to them.

Having thus fully described my invention, what I claim as new, and desire to secure by Letters Patent, is—

1. In combination with the cylinder D and arms E, the air-chamber F, placed upon the perforated reduced portion $b$ of the cylinder, open at its lower end, and provided with air-exit pipe $h$, substantially as and for the purposes herein set forth.

2. The within-described carbureting apparatus, consisting, essentially, of case A, carbureter G, float H, segmental arms E E, revolving cylinder D, air-chamber F, and pipe $h$, all the parts being constructed and arranged to operate as herein described.

In testomony that I claim the foregoing as my own I affix my signature in presence of two witnesses.

DAVID P. SANDERS.

Witnesses:
A. M. AYRES,
G. W. ROCKWELL.